United States Patent
Stout

(10) Patent No.: US 11,433,627 B2
(45) Date of Patent: Sep. 6, 2022

(54) METHOD OF FORMING FLUID CHANNELS ON A BATHTUB

(71) Applicant: Kohler Co., Kohler, WI (US)

(72) Inventor: Kenneth Stout, Sheboygan Falls, WI (US)

(73) Assignee: KOHLER CO., Kohler, WI (US)

( * ) Notice: Subject to any disclaimer, the term of this patent is extended or adjusted under 35 U.S.C. 154(b) by 529 days.

(21) Appl. No.: 16/577,023

(22) Filed: Sep. 20, 2019

(65) Prior Publication Data
US 2020/0094499 A1    Mar. 26, 2020

Related U.S. Application Data

(60) Provisional application No. 62/734,374, filed on Sep. 21, 2018.

(51) Int. Cl.
| | | |
|---|---|---|
| *B29C 71/00* | (2006.01) | |
| *B29C 70/54* | (2006.01) | |
| *B29L 31/00* | (2006.01) | |
| *B29K 309/08* | (2006.01) | |
| *A47K 3/02* | (2006.01) | |

(52) U.S. Cl.
CPC ........ *B29C 71/0009* (2013.01); *B29C 70/545* (2013.01); *A47K 3/02* (2013.01); *B29C 2071/0027* (2013.01); *B29K 2309/08* (2013.01); *B29L 2031/7692* (2013.01)

(58) Field of Classification Search
CPC .............. B29C 71/0009; B29C 70/545; B29C 2071/0027; A47K 3/02; B29K 2309/08; B29L 2031/7692
See application file for complete search history.

(56) References Cited

U.S. PATENT DOCUMENTS

| | | |
|---|---|---|
| 4,904,423 A | 2/1990 | Foreman et al. |
| 5,089,186 A | 2/1992 | Moore et al. |
| 5,725,044 A | 3/1998 | Hirokawa |
| 6,155,331 A | 12/2000 | Langer |
| 6,238,604 B1 * | 5/2001 | Pieper .................. B32B 27/308 264/154 |
| 6,478,073 B1 | 11/2002 | Grebe |
| 6,939,505 B2 | 9/2005 | Musso et al. |
| 7,284,589 B2 | 10/2007 | Pfeifer |
| 7,607,691 B2 | 10/2009 | Arnold et al. |
| 7,862,325 B2 | 1/2011 | Pietraszkiewicz et al. |
| 8,087,447 B2 | 1/2012 | Propheter-Hinckely |
| 8,449,705 B1 * | 5/2013 | Rufer ....................... F17C 1/00 220/591 |

(Continued)

FOREIGN PATENT DOCUMENTS

| | | |
|---|---|---|
| DE | 102010044287 | 3/2012 |
| JP | 2005-022288 | 1/2005 |

(Continued)

*Primary Examiner* — Vishal I Patel
(74) *Attorney, Agent, or Firm* — Foley & Lardner LLP

(57) ABSTRACT

A method of forming a bathtub includes forming a core from a core material, coupling the core to a bathtub shell, applying a reinforcing material to the bathtub shell over the core to form a reinforcement structure, forming one or more openings in the bathtub shell, and substantially removing the core from between the bathtub shell and the reinforcement structure to define one or more fluid channels of the bathtub.

20 Claims, 4 Drawing Sheets

(56) References Cited

U.S. PATENT DOCUMENTS

2012/0284913 A1\* 11/2012 Brunelle .................. A47K 3/00
　　　　　　　　　　　　　　　　　　　　　　　4/584
2016/0228940 A1　　8/2016　Roemheld et al.
2016/0375484 A1　12/2016　Fickel

FOREIGN PATENT DOCUMENTS

| JP | 2005-246396 | 9/2005 |
| KR | 10-0400132 B1 | 2/2002 |
| WO | WO 2013/064304 | 5/2013 |

\* cited by examiner

METHOD OF FORMING FLUID CHANNELS ON A BATHTUB

CROSS-REFERENCE TO RELATED PATENT APPLICATION

This application claims the benefit of and priority to U.S. Provisional Application No. 62/734,374, filed Sep. 21, 2018, the entire disclosure of which is hereby incorporated by reference herein.

BACKGROUND

The present disclosure relates generally to bathtubs. More specifically, the present disclosure relates to a method of forming fluid channels on bathtubs.

SUMMARY

At least one embodiment relates to a method of forming a bathtub. The method includes forming a core from a core material, coupling the core to a bathtub shell, applying a reinforcing material to the bathtub shell over the core to form a reinforcement structure, forming one or more openings in the bathtub shell, and substantially removing the core from between the bathtub shell and the reinforcement structure to define one or more fluid channels of the bathtub.

Another embodiment relates to a method of forming a bathtub. The method includes forming a core from a core material, wherein the core material is at least one of dissolvable or phase-changeable, coupling the core to a bathtub shell, applying a reinforcing material to the bathtub shell over the core to form a reinforcement structure, forming one or more openings in the bathtub shell to access the core, and substantially removing the core from between the bathtub shell and the reinforcement structure to define one or more fluid channels of the bathtub.

Yet another embodiment relates to a method of forming a bathtub. The method includes forming a core from a core material, coupling the core to a bathtub shell, applying a reinforcing material to the bathtub shell over the core to form a reinforcement structure, and substantially removing the core from between the bathtub shell and the reinforcement structure to define a fluid channel of the bathtub.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
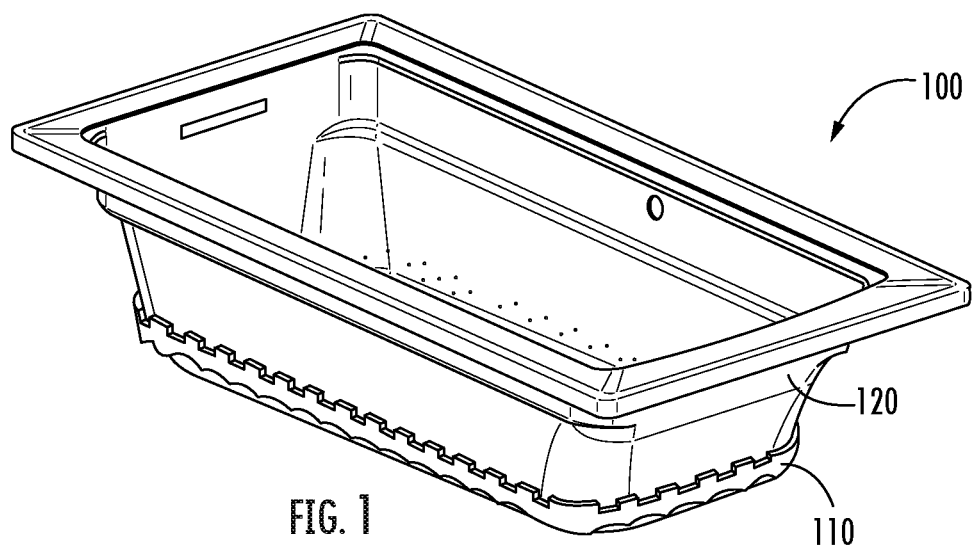
FIG. 1 is a perspective view of a bathtub shell including a core coupled thereto according to an exemplary embodiment.
Figure 2:
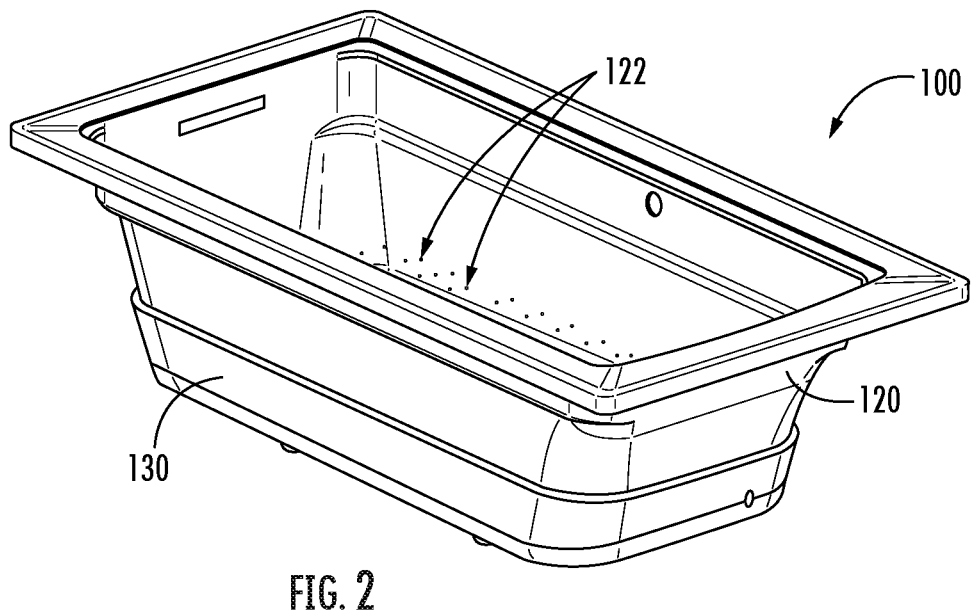
FIG. 2 is a perspective view of the bathtub shell of FIG. 1 after forming a reinforcement structure on the bathtub shell over the core.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Generally speaking, current processes for forming fluid channels, such as air channels or an overflow channel, on polymeric bathtubs include installing separate fluid channel assemblies onto the bathtub structures (e.g., a separate air channel assembly, overflow channel assembly, etc.). This process involves several steps and can be prone to issues resulting in failure of the bathtub structure and leaking of fluids.

For example, some processes include forming (e.g., casting, etc.) a bath "boot" over a thermoformed bathtub "shell," where the boot/shell includes air holes formed therein. This is followed by trimming of the boot/shell, and then grinding of the boot/shell surface to prepare the surface of the boot/shell for adhesion of separate air channel assemblies. Typically, the separate air channel assemblies that define the air channels are formed from fiberglass and are temporarily glued to the boot. In other processes, a separate fluid channel assembly, such as an overflow channel, is glued directly to the bathtub shell without a separate "boot," where the bathtub shell is made from a fiber-reinforced polymer (FRP). While the glue is holding the fiberglass fluid channel assemblies in place, the fluid channel assemblies can be coated with an overlying fiberglass material to provide additional reinforcement. Finally, the fluid channel assemblies, which have been reinforced with the overlying fiberglass material, are further coated with a sealing resin to ensure a water tight channel. In other words, conventional processes use preformed fiberglass fluid channel assemblies that are either attached to the boot after the boot has been cast over the bathtub shell or are attached directly to the bathtub shell itself. This process is time consuming, is procedurally taxing, is prone to failure, and can result in leaking baths.

Referring generally to the figures, disclosed herein is a method of forming fluid channels in a bathtub using a "lost core" casting process that can, advantageously, reduce the amount of time required to form the bathtub and provide for a more reliable bathtub structure that is less prone to leaking, as compared to conventional methods for forming fluid channels in bathtubs. The disclosed method may be used to form air channels of a hydrotherapy bathtub and/or an overflow channel on a bathtub between an overflow slot and a drain of the bathtub, so as to allow for water to drain from the bath if the bathtub is filled too high. It should be appreciated, however, that the disclosed method may be used to form other fluid channels on a bathtub or other type of vessel, such as a hot tub, a sink, or the like.

According to various exemplary embodiments, the disclosed method can form fluid channels in the tub as the bathtub shell is reinforced with a reinforcing material (e.g., fiber reinforced polymer (FRP), fiberglass, etc.) by using a temporary core made from at least one of a dissolvable or a phase-changeable material and having a shape of the fluid channels to be formed. In some exemplary embodiments, a fluid (e.g., water, air, chemicals, etc.) can be directed through one or more openings in the bathtub shell, so as to substantially remove the core material (e.g., by substantially dissolving the dissolvable material, etc.), thereby leaving empty fluid channels of the bathtub.

In another exemplary embodiment, where the core is made from a phase-changeable material, the phase-changeable material may have a relatively low melting point, such as a wax, such that as the reinforcing material on the bathtub shell cures, the heat energy from the reinforcing material can substantially melt the core material through the openings leaving empty fluid channels on the tub.

Thus, because the fluid channels are formed during reinforcement of the bathtub shell, the disclosed process, advantageously, eliminates unnecessary reinforcing and sealing steps (e.g., with the fiberglass and resin, respectively). In this manner, the disclosed method can reduce the amount of time to form a bathtub and can provide for a more reliable bathtub structure that is less prone to leaking.

According to another exemplary embodiment, one or more fluid channel structures may be formed by a thermoforming process and coupled to a side of the bathtub shell where it is desired to have the fluid channels located (e.g., using adhesive and/or other bonding agents, etc.). The reinforcing material can then be applied over the fluid channel structures and the bathtub shell using a casting process similar to the process explained above. In this exemplary embodiment, however, no material would be "lost" or removed from the assembly. Rather, the thermoformed fluid channel structures would act as a "dam" to keep the reinforcing material from flowing into the fluid channels themselves during the forming process.

Referring to FIGS. 1-5, a method of forming various fluid channels on a bathtub is shown according to various exemplary embodiments. In the exemplary embodiment of FIGS. 1-3, a bathtub is shown as a hydrotherapy bathtub 100 (sometimes referred to as a "bubble massaging bathtub") including one or more air channels 132 that are formed by a method shown in FIG. 5. In the exemplary embodiment of FIG. 4, a bathtub shown as a bathtub 100' includes an overflow channel 132' formed by the method of FIG. 5. It should be appreciated, however, that the disclosed method may be used to form other types of fluid channels and in other types of vessels, such as spas, sinks, pools, hot tubs, or the like.

Figure 5:
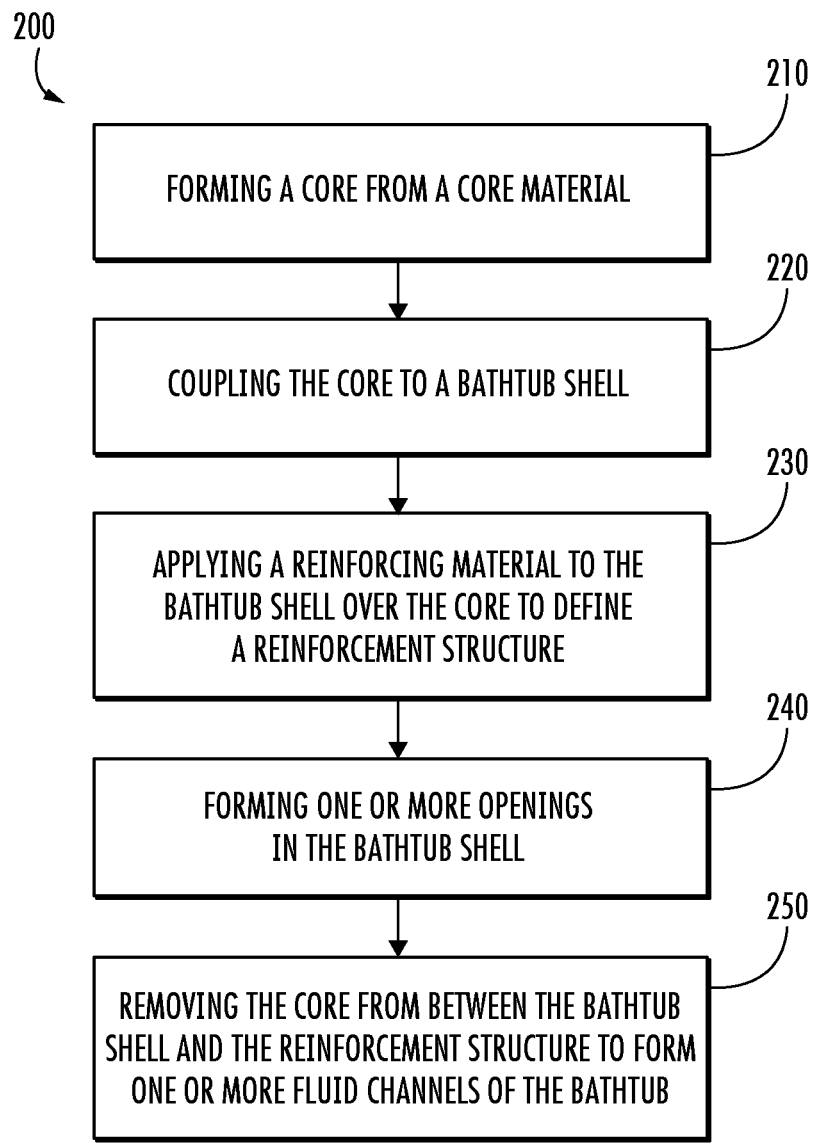
FIG. 5 is a flow chart illustrating a method of forming a fluid channel in a bathtub according to an exemplary embodiment.

In a first step 210 shown in FIG. 5, a core (e.g., temporary core, removable core, etc.) having the shape of one or more fluid channels (e.g., air channel 132, overflow channel 132', etc.) for a bathtub is formed from at least one of a dissolvable material or a phase-changeable material. In the exemplary embodiment of FIGS. 1-3, the core is shown as a core 110 having a shape of one or more air channels 132 for the hydrotherapy bathtub 100. In the exemplary embodiment of FIG. 4, the core is shown as a core 110' having a shape of an overflow channel 132' for the bathtub 100'. According to an exemplary embodiment, the dissolvable material is a water soluble material, such as salt, a dissolvable paper product, corn starch, or other dissolvable material or combinations of materials. According to another exemplary embodiment, the dissolvable material is a chemically-soluble material. According to other exemplary embodiments, the material is a phase-changeable material having a relatively low melting point, such as a wax, which can be substantially melted using heat energy (e.g., heat energy resulting from curing of a reinforcing material applied to the bathtub shell, etc.). According to an exemplary embodiment, the core is formed using a molding process by adding the dissolvable or phase-changeable material to a mold having a shape that corresponds to the shape of the fluid channels for the bathtub. According to other exemplary embodiments, the core is formed using other processes, such as a casting process or any other process suitable for forming the core.

After the core has cured in the mold, at step 220, the core is removed from the mold and coupled to a portion of a bathtub shell (e.g., base, basin, reservoir, etc.) at a location where it is desired to have the fluid channels. According to the exemplary embodiment of FIGS. 1-3, the core 110 is coupled to an outer surface of a bathtub shell 120 along a lower portion of the shell 120 using an adhesive (e.g., spray glue, etc.). According to the exemplary embodiment of FIG. 4, the core 110' is coupled to an outer side wall of the bathtub shell 120'. According to other exemplary embodiments, the core is coupled directly to the bathtub shell using other types of bonding agents. According to an exemplary embodiment, the bathtub shell is made from a thermoforming process using an acrylic material. According to other exemplary embodiments, the bathtub shell is made from a polymeric material or combinations of polymeric materials, such as a fiber reinforced polymer (FRP).

At step 230, a reinforcing material is applied to the bathtub shell over the core to form a reinforcement structure of the bathtub. According to an exemplary embodiment, the reinforcing material includes a fiber reinforced polymer (FRP). According to other exemplary embodiments, the reinforcing material includes other types of materials (e.g., fiberglass, etc.) or combinations of materials that can provide structural reinforcement to a polymeric bathtub structure. According to the exemplary embodiment of FIGS. 1-3, a reinforcement structure 130 defines a "boot" (e.g., base, etc.) of the hydrotherapy bathtub 100 where the air channels 132 are located. In the exemplary embodiment of FIG. 4, a reinforcement structure 130' defines part of an overflow channel 132' of the bathtub 100'. According to an exemplary embodiment, the reinforcement structure is overmolded on the core and the bathtub shell. The reinforcement structure is configured to define one or more fluid channels (e.g., air channels 132, overflow channel 132', etc.) of the bathtub that will be left when the core is substantially removed (e.g., dissolved, melted, etc.) from between the bathtub shell and the reinforcement structure. That is to say, the outer shape of the core defines an inner portion of the reinforcement structure during the forming step 220, which has a shape that corresponds to the shape of the fluid channels for the bathtub.

According to an exemplary embodiment, the core may be made from a material having a relatively low melting point, such as a wax, so that as the reinforcing material is curing on the bathtub shell over the core, the heat energy from the reinforcing material can substantially melt the core to leave empty fluid channels defined between an inner portion of the reinforcement structure and an outer portion of the bathtub shell. According to another exemplary embodiment, the core may be made from a dissolvable material, such as a dissolvable paper product, salt, corn starch, or other dissolvable material or combinations of materials.

Figure 3:
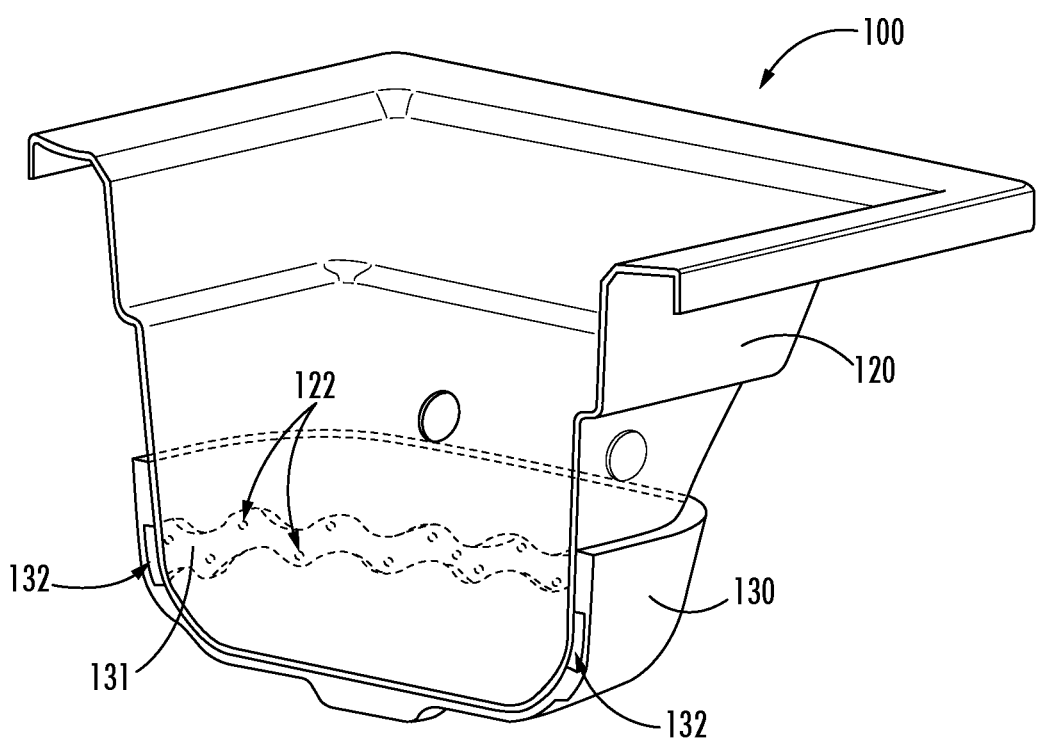
FIG. 3 is a cross-sectional view of the bathtub shell and reinforcement structure of FIG. 2 after substantially removing the core to form one or more air channels.
Figure 4:
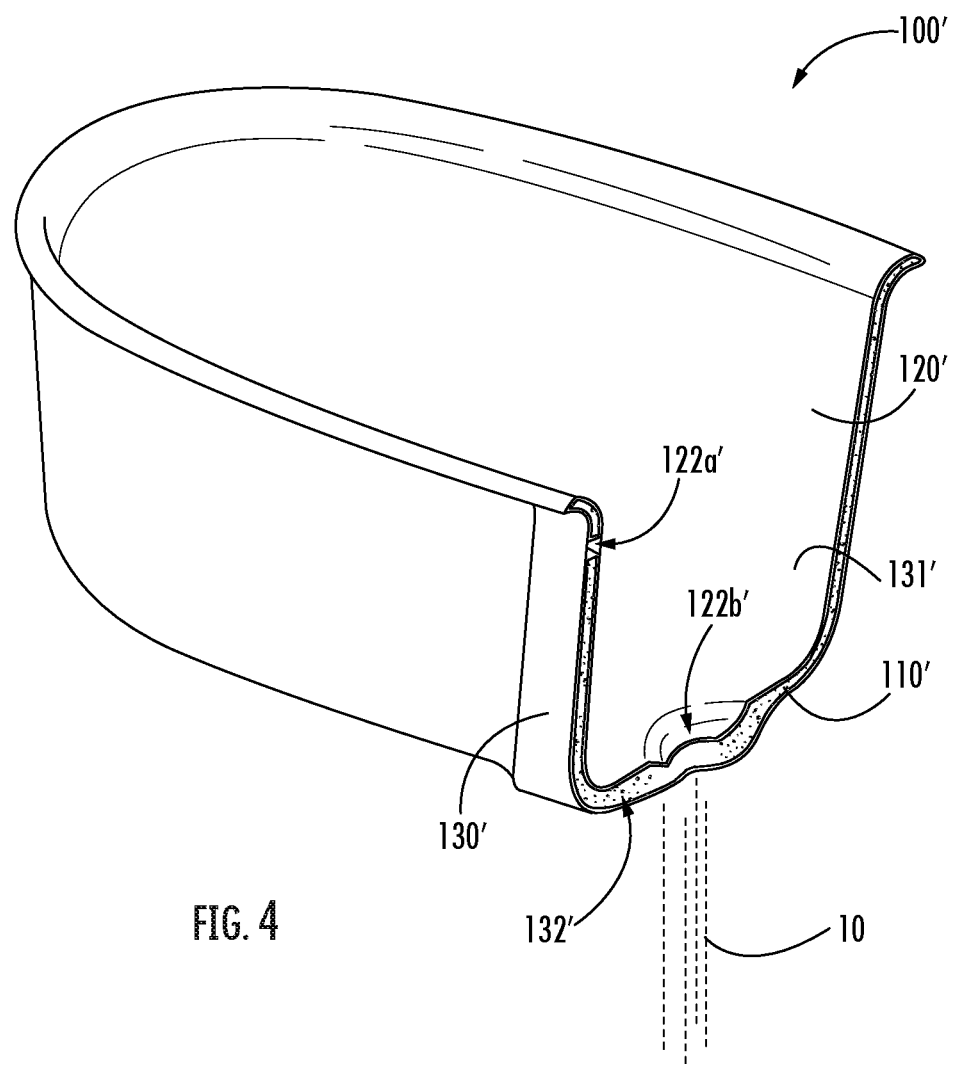
FIG. 4 is a cross-sectional view of a bathtub shell and a reinforcement structure after substantially removing a core to form an overflow channel, according to another exemplary embodiment.

At step 240, one or more openings are formed in the bathtub shell to access the core, so as to facilitate removal of the core. For example, as shown in the embodiment of FIG. 3, air holes 122 are formed through a lower inner portion of the bathtub shell 120 where the reinforcement structure 130 and the core 110 are generally positioned. In this way, the core 110 is accessible through the bathtub shell 110 via the air holes 122. According to an exemplary embodiment, the air holes 122 are formed using a drill and a template that includes locations for each of the air holes on the bathtub 100. According to another exemplary embodiment, the air holes 122 are pre-formed in the bathtub shell 120. According to the exemplary embodiment of FIG. 4, an overflow slot 122a' and a drain hole 122b' are each formed through an inner portion of the bathtub shell 120', so as to provide a pathway for removal of the core 110' from between the bathtub shell 120' and the reinforcement structure 130'. A fluid, shown as water 10, may be directed through the overflow slot 122a' to substantially remove the core 110' out through the drain hole 122b'.

According to another exemplary embodiment, where the core is made from a phase-changeable material, such as a wax, the openings are formed in the bathtub shell before the core is coupled to the bathtub shell. In this way, as the reinforcing material is curing on the bathtub shell over the core to form the reinforcement structure, the substantially melted core can exit the bathtub shell through the openings (e.g., air holes 122, drain hole 122b', etc.), so as to define the one or more fluid channels.

At step 250, the core is substantially removed from the bathtub shell. According to an exemplary embodiment, a fluid (e.g., water 10, air, chemicals, etc.) is directed through the one or more openings (e.g., air holes 122, overflow slot 122a', etc.) to substantially remove the core from between the reinforcement structure and the bathtub shell. In this manner, one or more fluid channels (e.g., air channels 132, overflow channel 132', etc.) can be left behind by the core. According to another exemplary embodiment, where the core is made from a water soluble material, the bathtub shell may be at least partially filled with water such that the water is directed into the air holes 122 or the overflow slot 122a', respectively, to substantially dissolve the core. According to other exemplary embodiments, the core is substantially removed by directing fluid through other openings located in the bathtub shell and/or the reinforcement structure. As shown in the embodiment of FIG. 3, the air channels 132 are cooperatively defined by an inner surface 131 of the reinforcement structure 130, which was formed during the forming step 220 using the temporary core 110, and an outer portion of the bathtub shell 120. Similarly, in the embodiment of FIG. 4, the overflow channel 132' is cooperatively defined by an inner surface 131' of the reinforcement structure 130', which was formed during the forming step 220 using the temporary core 110', and a portion of the bathtub shell 120'.

Because the fluid channels are formed during the forming process of the reinforcement structure, the disclosed method, advantageously, eliminates unnecessary reinforcing and sealing steps (e.g., with the fiberglass and resin, respectively), as compared to conventional methods for forming fluid channels in bathtubs. In this manner, the disclosed method can reduce the amount of time to form a bathtub and can provide for a more reliable bathtub structure that is less prone to leaking.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. For example, as used herein, the term "substantially" is intended to cover situations where there may be some residual amount of core material left in the air channels after removal of the core 110, as would be appreciated by a person of skill in the art performing the disclosed method.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and method as shown in the various exemplary embodiments is illustrative only. Additionally, any element disclosed in one embodiment may be incorporated or utilized with any other embodiment disclosed herein.

What is claimed is:
1. A method of forming a bathtub, the method comprising:
forming a core from a core material;
coupling the core to a bathtub shell;
applying a reinforcing material to the bathtub shell over the core to form a reinforcement structure;
forming one or more openings in the bathtub shell; and substantially removing the core from between the bathtub shell and the reinforcement structure to define one or more fluid channels of the bathtub.

2. The method of claim 1, wherein substantially removing the core includes directing a fluid through the one or more openings of the bathtub shell.

3. The method of claim 1, wherein the core material is dissolvable, and wherein substantially removing the core includes at least partially filling the bathtub shell with fluid to direct fluid to the core through the one or more openings, so as to substantially dissolve the core.

4. The method of claim 1, wherein the core material includes a wax, and wherein substantially removing the core includes substantially melting the core by heat energy from curing of the reinforcing material.

5. The method of claim 4, wherein the one or more openings are configured to direct the substantially melted core away from the bathtub shell.

6. The method of claim 4, wherein the one or more openings are formed in the bathtub shell before coupling the core to the bathtub shell.

7. The method of claim 1, wherein the core material is dissolvable.

8. The method of claim 1, wherein the core material is corn starch.

9. The method of claim 1, wherein the reinforcing material includes a fiber reinforced polymer.

10. A method of forming a bathtub, the method comprising:
forming a core from a core material, wherein the core material is at least one of a dissolvable material or a phase-changeable material;
coupling the core to a bathtub shell;
applying a reinforcing material to the bathtub shell over the core to form a reinforcement structure;
forming one or more openings in the bathtub shell to access the core; and
substantially removing the core from between the bathtub shell and the reinforcement structure to define one or more fluid channels of the bathtub.

11. The method of claim 10, wherein substantially removing the core includes directing a fluid through the one or more openings.

12. The method of claim 10, wherein the core material is dissolvable, and wherein substantially removing the core includes at least partially filling the bathtub shell with fluid to direct the fluid to the core through the one or more openings, so as to substantially dissolve the core.

13. The method of claim 10, wherein the core material includes a wax, and wherein substantially removing the core includes substantially melting the core using heat energy from curing of the reinforcing material.

14. The method of claim 13, wherein the one or more openings are configured to direct the substantially melted core away from the bathtub shell.

15. The method of claim 13, wherein the one or more openings are formed in the bathtub shell before coupling the core to the bathtub shell.

16. The method of claim 10, wherein the core material is dissolvable.

17. The method of claim 10, wherein the core material is corn starch.

18. The method of claim 10, wherein the reinforcing material includes a fiber reinforced polymer.

19. A method of forming a bathtub, the method comprising:
forming a core from a core material;
coupling the core to a bathtub shell;
applying a reinforcing material to the bathtub shell over the core to form a reinforcement structure; and
substantially removing the core from between the bathtub shell and the reinforcement structure to define a fluid channel of the bathtub.

20. The method of claim 19, wherein the fluid channel is at least one of an overflow channel or an air channel of the bathtub.

* * * * *